United States Patent [19]
Dechamboux

[11] Patent Number: 6,052,528
[45] Date of Patent: Apr. 18, 2000

[54] PROCESS FOR MANAGING THE MULTIPLE INHERITANCE OF PERSISTENT AND SHARED OBJECTS

[75] Inventor: Pascal Dechamboux, Grenoble, France

[73] Assignee: Bull S.A., Puteaux, France

[21] Appl. No.: 08/856,040

[22] Filed: May 14, 1997

Related U.S. Application Data

[63] Continuation of application No. 08/401,351, Mar. 9, 1995, abandoned.

[30] Foreign Application Priority Data

Mar. 10, 1994 [FR] France ................................... 94 02790

[51] Int. Cl.$^7$ ..................................................... G06F 9/45
[52] U.S. Cl. ............................................ 395/708; 707/104
[58] Field of Search ..................................... 395/683, 708, 395/680; 707/104; 709/303, 300

[56] References Cited

U.S. PATENT DOCUMENTS

| | | | |
|---|---|---|---|
| 4,853,842 | 8/1989 | Thatte et al. ............................. | 364/200 |
| 5,247,669 | 9/1993 | Abraham et al. ........................ | 707/103 |
| 5,313,630 | 5/1994 | Namioka et al. ........................ | 395/683 |
| 5,327,562 | 7/1994 | Adcock .................................... | 395/708 |
| 5,542,078 | 7/1996 | Martel et al. . | |
| 5,615,400 | 3/1997 | Coswar et al. ........................... | 395/685 |
| 5,630,087 | 5/1997 | Talluri et al. ............................ | 711/202 |
| 5,740,439 | 4/1998 | Atkinson et al. ........................ | 395/701 |

OTHER PUBLICATIONS

Ahad, Rafiul; Tu–Ting Cheng; HP OpenODB: an object oriented database management system for commercial applications, Hewlett–Packard Journal, v44, n3, p. 20, Jun. 1993.

Margaret Ellis, Bjarne Stroustrup, The Annotated C++ Reference Manual; Dec. 1990, pp. 200–232.

Ahad, Rafiul, Tu–Ting, Cheng, HP OpenODB an object–oriented database management system for commercial applications, Jun. 1993, Hewlett–Packard, v44, p. 20(11).

The Gemstone Object Database management system, Butterworth, Paul, Otis, Allen, Stein, Jacob, Communications of ACM, v34, n10, p. 64(14).

*Primary Examiner*—Lucien U. Toplu
*Assistant Examiner*—Peter Stecher
*Attorney, Agent, or Firm*—Weingarten, Schurgin, Gagnebin & Hayes LLP

[57] ABSTRACT

A process for the management of multiple inheritance for application in a system or language employing persistent and shared objects. According to this process, the format of an object is maintained unchanged when it is being loaded from persistent space into virtual space. Moreover, each class producing an object is associated with an identifier of the class constant in all those applications utilizing the class as well as through all the recompilations. The structure of the object is thus independent of the address of storage in memory and of the code of the class producing this object. Finally, according to the present process, an addressing path permitting the management of inheritance is imposed via different tables.

12 Claims, 2 Drawing Sheets

PROCESS FOR MANAGING THE MULTIPLE INHERITANCE OF PERSISTENT AND SHARED OBJECTS

This application is a continuation of application application Ser. No. 08/401,351, filed Mar. 9, 1995, now abandoned.

FIELD OF THE INVENTION

The present invention concerns a process for managing multiple inheritance in a system or a language employing persistent and shared objects.

BACKGROUND OF THE INVENTION

Object-oriented languages or systems are generally based upon the notion of a class which is an entity permitting the generation and manipulation of objects. A class defines, on the one hand, the structure of the objects which it is going to generate via the definition of attributes and, on the other, the behavior of these objects by means of the definition of the methods. Furthermore, the possibility of defining an inheritance relationship between various classes is an essential characteristic of languages of this type, this relationship being able to be and being generally a multiple inheritance relationship.

Multiple inheritance means that the same class is defined by inheritance from several other classes. Remember, a class which inherits from another class is commonly called a "derived class", the class inherited from then being considered a "base class" of the derived class. Likewise, two components are currently distinguished in the inheritance relationship with regard to the notion of class. A first component concerns structural inheritance: the structure of an object of a given class is composed of attributes defined in this class as well as the total group of attributes of the classes inherited directly or indirectly. The second component relates to behavioral inheritance: the methods permitting the manipulation of an object are those defined in its class as well as all those defined in the classes inherited directly or indirectly. Added to this aspect is generally the possibility of overloading a derived class with the code of a method defined in a base class. This function then requires a mechanism of dynamic linkage to the execution, called "late binding" by the man of art.

When such an object-oriented language (for example, C++) is compiled, the compiler must define the storage location of the objects in memory as well as the addressing of the attributes and associated methods. The management of the multiple inheritance of objects becomes complicated rather quickly and poses problems; but in the case of nonpersistent objects there is an effective technique, implemented with the C++ language, which permits the resolution of the problems posed by multiple inheritance. This technique is described by M. A. Ellis and B. Stroustrup in *The Annotated C++ Reference Manual*, Addison-Wesley, 1990.

Unfortunately, this technique presents a major inconvenience, because it becomes ineffective and thus useless where there is a need to apply it in the case of objects which are persistent (objects which survive when the execution of the program which produced them comes to an end) and shared (several programs access a single object simultaneously).

The purpose of the present invention is to provide a solution to the problems cited above and to propose a process for the management of multiple inheritance which can be utilized easily and effectively in a system or by the code generator of a language employing persistent and shared objects.

SUMMARY OF THE INVENTION

For that, the process for the management of multiple inheritance mentioned in the introduction is remarkable by virtue of the fact that the format of an object is retained unchanged during the loading of said object from persistent space into virtual space, each class engendering an object being associated with an identifier of the constant class in all those applications utilizing the class as well as through all the recompilations, the structure of the object thus being independent of the address location in memory and of the code of the class producing this object, even though an addressing path permitting the management of inheritance is borrowed via different tables.

Moreover, the process for the management of multiple inheritance according to the present invention is remarkable due to the fact that, for the storing of objects in memory, each class is associated with a part identical for all those objects belonging to this class, each part being composed of two subparts, a first subpart comprising an identifier of the real class which produced the object, an identifier utilized as an index in a class table giving the entry point of the path permitting management of the inheritance, and a second subpart containing the state defined by the class having produced the object, the total group of the attributes defined by this class being regrouped in this state.

Thus, according to the concept of the invention, the greater part of the treatment is operated statically, that is to say, at the moment of compilation, and the addressing path is elaborated to authorize with certainty the call to that method adequate at the moment of execution. This technique guarantees that it will be possible to apply this method again, without preliminary operation, to that object in the course of being loaded. The structure of the object is independent of its memory location, thus of the address where it is going to be stored, and independent of the code of the class which produced the object.

BRIEF DESCRIPTION OF THE DRAWINGS

The following description along with the following examples, the whole being presented as a nonrestrictive example, shall make it more easily understood how the invention can be realized.

DESCRIPTION OF THE PREFERRED EMBODIMENTS

Using the multiple-inheritance example presented in FIGS. 1 and 2 as a point of departure, and for a better understanding of the concept of the invention, there will first of all be a description of several problems associated with the management of multiple inheritance. In particular, it shall become apparent from this introduction that it is not possible to define a memory location for these objects which permits the static allocation, that is to say, at the moment of compilation, of the addresses for the attributes of an object. The same conclusion results from examination of the call to overloaded methods.

Figure 1A:
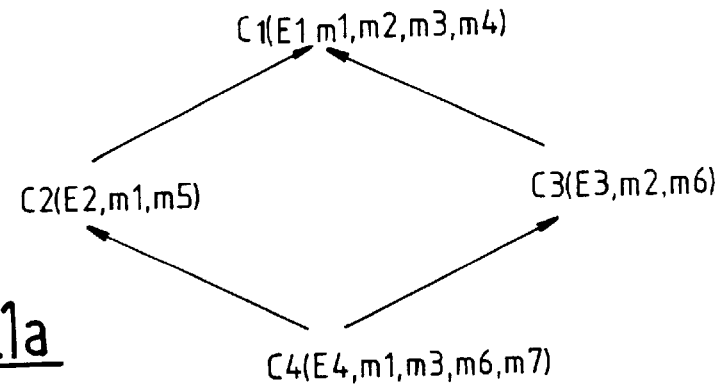
FIGS. 1a and 1b present, for a given example of multiple inheritance, a solution of the preceding type for nonpersistent objects which are not shared.
Figure 1B:
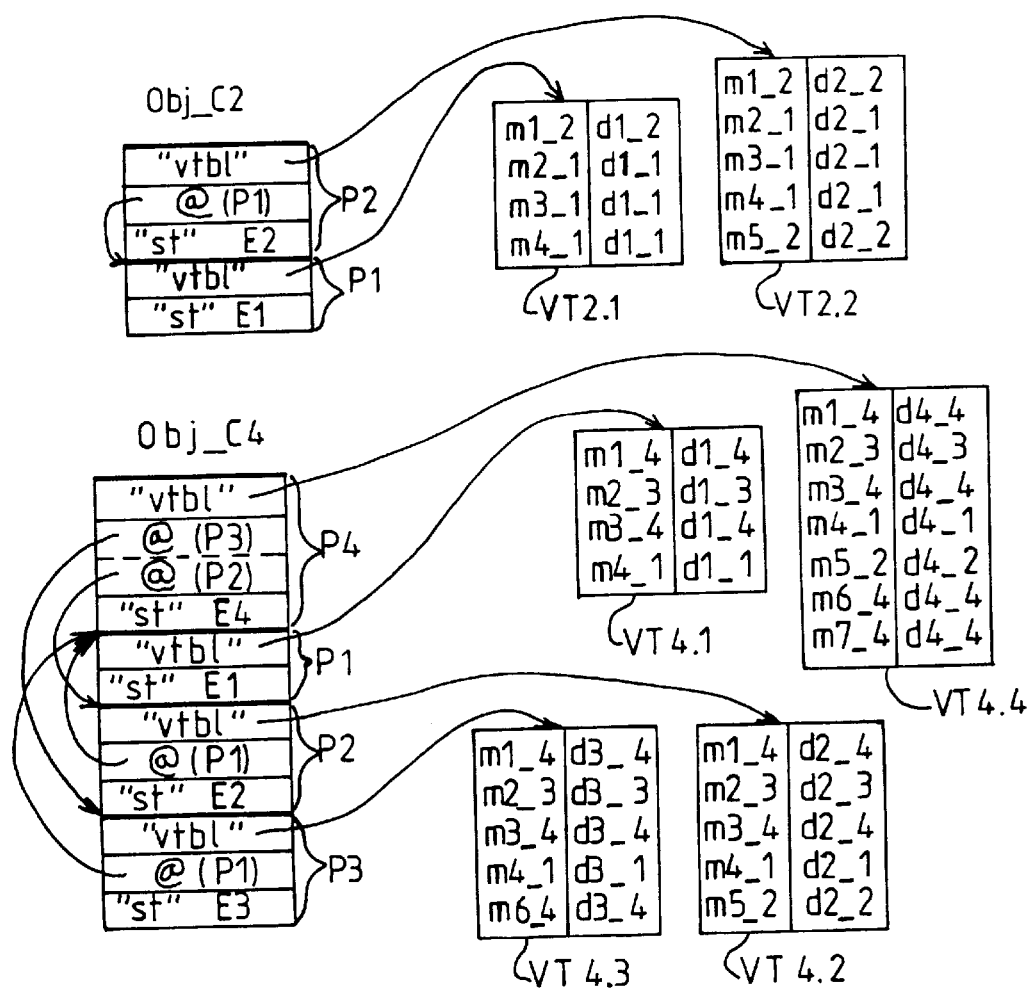
Figure 2A:
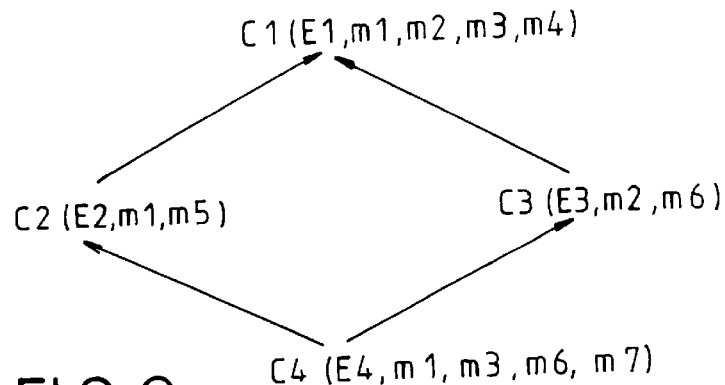
FIGS. 2a and 2b present, for the same multiple-inheritance example, that solution applicable per the invention of persistent and shared objects.

With the simple example selected and represented in FIGS. 1a and 2a, four classes C1, C2, C3 and C4 are described. Classes C2 and C3 stand in a direct inheritance relationship to class C1. Class C4 is in a direct multiple-inheritance relationship with classes C2 and C3, and in an indirect one with class C1 through the intermediary of classes C2 and C3. Each class Ci defines its own attributes which are re-grouped in a state Ei. Thus, in FIGS. 1a and 2a, the attributes of classes C1, C2, C3 and C4 are collected respectively in states E1, E2, E3 and E4. The methods mi associated with each class in the example are the methods stored by the class, thus, in the example, methods m1, m2, m3 and m4 are stored by class C1, methods m1 and m5 by class C2, methods m2 and m6 by class C3 and, finally, methods m1, m3, m6 and m7 by class C4.

The first problem encountered concerns the addressing of the state Ei. In fact, the memory location of an object corresponds to the memory area in which the attributes composing the object are found. This area thus contains all the states Ei of the classes to which this object belongs. Thus, in the example chosen, an object of class C1 would be sited in a zone (i.e. a memory area) containing E1, an object of class C2 in a zone containing E1 and E2, an object of class C3 in a zone containing E1 and E3 and an object of class C4 in a zone containing E1, E2, E3 and E4. In this case, a variable of type C3 in a program is able to designate an object from class C3 as well as one from class C4. But if state E3 is accessed through this variable, it is clear that it is not possible to define its relative address statically in the object. One solution would be to reserve the zone containing state E2 also in those objects of class C3, though state E2 which is not utilized in C3, that is to say, an object from class C3 would be defined in a zone containing E1, E2 and E3. Nevertheless, this solution cannot be exploited to advantage because it would produce a considerable loss of space in memory. This is even more true in the case of persistent objects because such a solution would require the reconstruction of the existing objects at the time of certain additions to the derivative classes. The first allocation proposed is thus preferable from the viewpoint of memory utilization but has for its principal disadvantage the need to calculate the addresses of the states Ei dynamically.

The second problem encountered concerns the mi method call. In fact, calling the method implies the dynamic determination of the code to be called. Thus, taking method ml in the example cited above and applying this method to an object designated and thus manipulated by means of a variable V of type C1 (C++ call of the "V→m1" type), it is apparent that this object can belong indifferently to class C1, C2, C3 or C4. According to its real type, which can be known only on execution, the method to be applied is thus not the same. The present example can be illustrated as follows:

```
C1 *v, *v1;
C2 *v2;
C3 *v3;
C4 *v4;
v1 = new C1( ); v2 = new C2( ); v3 = new C3( ); v4 = new C4( );
v = v1; v→m1( ); /* call to m1 defined in C1 */
v = v2; v→m1( ); /* call to m1 defined in C2 */
v = v3; v→m1( ); /* call to m1 defined in C3 */
v = v4; v→m1( ); /* call to m1 defined in C4 */
```

The problem is thus clearly evident, thanks to this example, among the four possible "v→m1( );" calls; there exist three different execution cases, though the compiler is able to interpret this situation as being only a single case. In This case, the C++ language provides a satisfactory solution. Thus, for the resolution of the problems cited above, the C++ language utilizes, on the one hand, pointers which hold the memory address of the object for access to the inherited states and, on the other, indirection tables termed, by the man of art, "virtual tables" for the resolution of the method call.

As previously stated, this technique is made explicit by M. A. Ellis and B. Stroustrup in *The Annotated C++ Reference Manual*, Addison-Wesley, 1990. The example proposed and described with FIG. 1b makes it possible to schematize memory allocation, for the management of inheritance, of a C++ object of class C2 (Obj__C2) and that of an object of class C4 (Obj__C4), preserving in spirit that each class Ci will define a state Ei and a certain number of methods, certain of them being overloaded (see FIG. 1a).

For memory allocation, the compiler then assigned, to each class Ci (C1, C2, C3 and C4), a part Pi (P1, P2, P3 and P4) which is the same for all the objects belonging to this class Ci, either by direct inheritance of an object of class Ci, or by inheritance of an object from a derived class of Ci. All the parts Pi contain three distinct subparts:

a first subpart corresponding to a pointer to a virtual table (VT2.1, VT2.2, VT4.1, VT4.2, VT4.3, VT4.4) contained in the code of the class which makes it possible to manage the calling of any method (m1, m2, ... m7) applicable to an object of class Ci (C2, C4). This field is the same for all the parts; it is called and referenced to the "vtbl" plan. Each element of a virtual table contains two fields, the first being a pointer to a C function storing a C++ method and the second an offset for calculation of the pointer to that part of the object to be passed as the first parameter of the C function, this parameter corresponding to the "this" utilized in the body of a C++ method. Thus, for example, the virtual table VT2.1, pointed to by the "vtbl" field of the part P1 associated with the class C1 of an object of class C2 (Obj__C2), contains four elements which each concern a method m1, m2, m3 and m4 stored by class C1, each element containing two fields. The first field m1__2 of the first element is in this case a pointer to the function storing the method m1 in class C2, whereas the second field d1__2 corresponds to the offset permitting calculation of the pointer to the part P2 of the object of class C2. In the same way, the virtual table VT4.3, pointed to by the "vtbl" field of the part P3 associated with the class C3 of an object of class C4 (Obj__C4), comprises five elements, each concerning either a method m2, m6 stored by class C3, or an overloaded method m1, m3, m4 inherited from class C1. The first field m1__4 of the first element is in this case a pointer to the function storing the method m1 in class C4, while the second field d3__4 corresponds to the offset permitting calculation of the pointer to the part P4 of the object of class C4.

a second part corresponding to pointers to the parts Pj for all the classes Cj from which Ci inherits directly, these pointers being called "Pj__addr" and referenced @(Pj). For example, for part P2: "P1__addr" (@(P1)) or, for part P4: "P2__addr" (@(P2)) and "P3__addr" (@(P3)).

a third subpart which corresponds to the state Ei defined by the class Ci, this Pi field being named and referenced "st".

It is moreover important to remember that a variable of the type Ci, for example, "Ci *V", always points to a part Pi, whatever the real class of the object pointed to. Thus, to define the variable "C2 *V" (FIG. 1b), V designates Obj_C2, this variable pointing to the starting address of the object (starting address of part P2), whereas, if V designates Obj_C4, the variable V will point to the middle of the object, the starting address of part P2.

After having described all the data implemented in C++ objects, and outside them, to manage the semantics of virtual inheritance, an examination shall be made of how these data are utilized to calculate the access to the various parts of the Ei state of an object, or for calling an mi method. It is assumed in the following example that the objects Obj_C2 and Obj_C4 are designated by means of a pointer of the C2 type contained in a variable V.

The cost of accessing the state Ei of an object will vary according to the type of pointer to the object and the part of the state to be accessed. When the part corresponds to the pointer type, the cost of access in this case is merely an indirection. This is the case for access to the state E2 which is translated by "V→st", for object Obj_C2 as well as for the object Obj_C4. On the other hand, if access is desired to the state E1, that is expressed by "V→P1_addr→st", that is to say, this access is at the cost of a double indirection. In fact, there are as many indirections, plus one, as the number of inheritance levels separating the part pointed to from that of the state to be accessed. For example, to gain access from part P4 to the state E1: "P4→P2_addr→P1_addr→st", or also "P4→P3_addr→P1_addr→st".

As for calling an mi method, the cost is constant whatever the class in which the method called is implemented. Returning to the previous example (Obj_C2 and Obj_C4, accessed by means of a pointer of type C2 contained in a "V" variable), the code for a "V→m2( )" call in C++ is obviously the same as the call made to the object Obj_C2 or the object Obj_C4. Thus, in this specific example, the call is translated by:

"(*(V→vtbl[index(m2)].m)(V+V→vtbl[index(m2)].d, . . . "

The first expression (between parentheses) permits the recovery of the address of the pertinent code of the m2 method in the virtual table associated with the object: for the object Obj_C2, table VT2.2, m2_1, or for the object Obj_C4, virtual table VT4.2, m2_3. The index in the table is calculated statically; it is a priori different for each class in which the method is visible. The second expression permits the calculation of the pointer V designating the part on which the method called always works: pointer to part Pj, here P2, of class Cj, here C2, which defines the method m2 called. This calculation is carried out by recovering the offset relative to the call pointer, this offset being stored in the virtual table, at the address corresponding to the method m2 called: for the object Obj_C2 in the virtual table VT2.2, d2_1, or for the object Obj_C4 in the virtual table VT4, d2_3.

In the context of an object-oriented language compiled by working in main memory, the technique implemented in this method has proven to be reliably effective. On the other hand, this technique leads to numerous problems when there is a desire to apply it to a language manipulating persistent objects, shared by several by several applications in the course of execution.

Thus, in this new context which is that for which the invention was implemented, two principal difficulties are encountered, a first which concerns first of all pointers to the virtual tables contained in the code of the classes, this technique posing in effect the following problems relating, on the one hand, to the persistence and, on the other, to the sharing.

With regard to the persistence, it is unrealistic to seek a guarantee that the code for a class will always be loaded at the same address, if only because the code for a class must be able to change. The solution to this problem can be achieved by changing the "vtbl" pointers each time an object is loaded in a new session, when the application is executed, but this solution is costly and relatively complex to implement.

Furthermore, relative to sharing, it would be necessary to ensure that the code of a class is connected and thus attached to the same address in all the applications which utilize it. The solution in this case would consist of the fixed storage of the code for the classes in a shared library; but this technique cannot be considered seriously because it is poorly adapted to libraries whose code must be precisely able to change regularly, the modification of a shared library simultaneously with the utilization of said library by applications in the course of execution being impossible.

Still within this new context, a second difficulty is encountered, this latter, primarily associated with the persistence, concerning the pointers to the parts Pj of the base classes. In fact, it is essential to be able to guarantee that an object will always be coupled to the same virtual address from one session to another. The technique described above can be implemented only with the aid of a UNIX file (trademark owned by UNIX System Laboratories, Inc.) of the type called (by the man of art) "mapped", that is to say, one for which the correspondences are imposed, this being very unlikely where it would be possible to guarantee that this file will always be found at the same virtual address. Another technique could however consist of refreshing these pointers during loading of the object, but this second solution is even more costly and complicated to implement.

In conformity with the concept of the present invention, in this context where a system or a language employing persistent and shared objects is utilized, the process for the management of multiple inheritance is remarkable in that the format of an object is maintained unchanged during the loading of said object from persistent space into virtual space, each class producing an object associated with a class identifier constant in all the applications utilizing the class, as through all the recompilations, the structure of the object being thus independent of the address at which it is stored in memory and of the code producing this object, even though an access path permitting the management of inheritance is borrowed via different tables.

Thus, according to the solution under claim, a format is proposed for persistent C++ objects, accompanied by an inheritance-management technique making it possible to offer responses to those problems typical of the latter context described above. Its field of application includes all languages employing persistent objects as well as management systems based on object data permitting a multiple inheritance function similar to that of the C++ language (virtual inheritance and virtual methods).

There will be no algorithm given here permitting the production of the data structures necessary to the mechanism, nor even the algorithm for the translation of source code into object code utilizing these structures. These algorithms are in fact specific to each of the languages which make use of this technique, even if they have characteristics in common which the man of art will find obvious by referring to the translation example given below, particularly after the description of FIG. 2.

An immediate advantage of the proposed object format is that this format is kept identical in the persistent space and in the virtual space, no translation of the format being necessary during the loading of the object from the persistent space, for example, the hard disk, into virtual space, for example, the main memory.

Per the invention, the following minimal assumption is made that a class identifier constant for all those objects utilizing the class, as well as through all recompilations, is assigned to each class producing a persistent object. This minimal assumption is indispensable for the implementation of the invention in this context of persistent and shared objects. The class identifier is preferably an integer. Thus, whenever mention is made below of a class Ci, i is the identifier of the class.

The same will hold true remarkably for the storage of objects in memory. Each class is associated with a part which is identical for all those objects belonging to this class, each part being composed of two subparts, a first subpart containing an identifier of the real class having produced the object, the identifier being utilized as an index in a table of classes yielding the point of entry for the path permitting the management of inheritance, and a second subpart containing the state defined by the class which produced the object, the totality of attributes defined by this class being regrouped in this state.

Figure 2B:
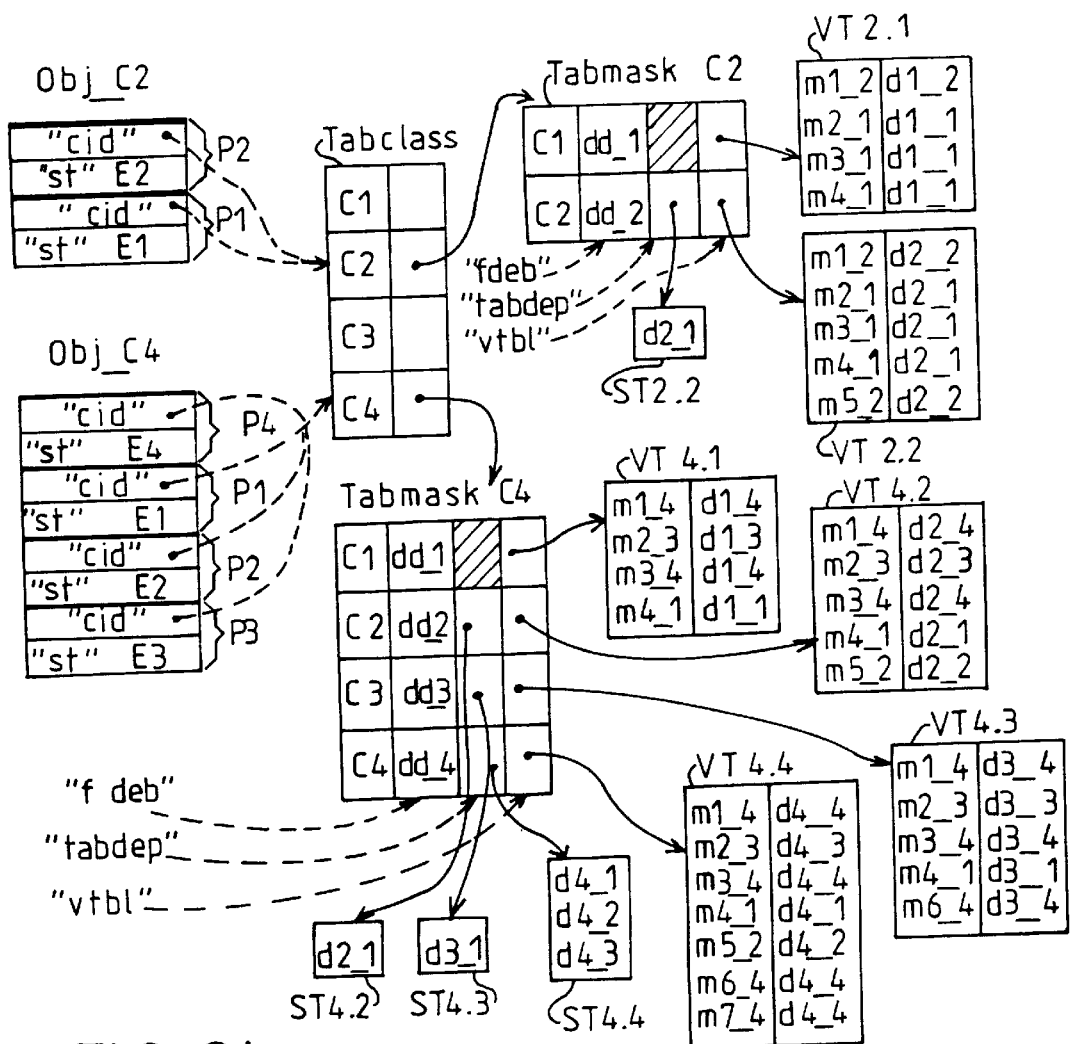

In this way, for the storage of the objects in memory, the compiler is going to associate with each class a part Pi which is the same for all those objects belonging to this class. In FIG. 2b, part P1, for example, is the same, whether it concerns an object of class C2 (Obj__C2) or an object from class C4 (Obj__C4). In FIG. 2b, each part Pi is seen to be composed of two subparts rather than three (see FIG. 1b), as in the example above describing the prior art.

The first subpart corresponds to the identifier of the real class of the object, that is to say, of the class which produced the object. This identifier is going to be utilized as an index in a table of classes, termed and referred to in the drawing as Tabclass, which yields the entry point of a path permitting the management of inheritance. For a given object, composed of several parts Pi, this identifier is thus duplicated in each part Pi. The identifier for the object Obj__C2 is therefore the same for parts P1 and P2; or the identifier for the object Obj__C4 is the same for parts P1, P2, P3 and P4. This choice is necessary, because it is desirable to be able to reference the object by any one of its parts, according to the type of variable referencing said object, a variable of type Ci pointing always to a part Pi. This Pi field is called "cid".

The second subpart corresponds to the Ei state defined by the class Ci. This field is called "st", as in FIG. 1b. Thus far it can be seen that we have had the benefit of an increase in memory space in an object, since the only thing required is data equivalent to a pointer to the virtual table, data relative to the pointers parts of the direct base classes of a class not being needed. It can now be shown, via the same example presented with the solution of the prior art, how to manage multiple inheritance from tables of indirection, or virtual tables, in a manner original with regard to the management process implemented in the prior art with C++.

Assumed, as in the preceding example, is a variable V of type Ci which designates an object Obj__Cj of type Cj, Cj being either the class Ci itself, or a derivative class of Ci. The type Ci of the variable determines a group of methods applicable to the object which is, in fact, a subgroup of the group of methods applicable to the object Obj__Cj, this latter group being defined by the real type Cj of the object. Remarkably, each base class Cj defines an access mask to methods at the same time applicable to an object of the real Cj type as well as to those parts corresponding to these base classes. That is what is shown in FIG. 2b where the table called Tabclass supplies a pointer to a table of masks called Tabmask__Cj for each class Cj, Tabmask__C2 and Tabmask__C4 in the table containing different masks permitting the manipulation of an object of the Cj type, Obj__C2 or Obj__C4, to be manipulated. In fact, a mask makes it possible to describe the different types of variables through which the object of a given class can be manipulated.

According to the invention, a mask table will contain as many masks as there are inherited classes, plus one, the class having produced the object, each mask (each line of the table) containing three fields. The first field, called "fdeb" corresponds to the offset dd__1 (dd__1 to dd__2 for Tabmask__C2 and dd__1 and dd__4 for Tabmask__C4), which permits the calculation of a pointer to the part Pi from a pointer to the starting address of the object, and vice versa. The second field, called "tabdep", corresponds to a pointer to an offset table, thus, to the offset table ST2.2 (offset d2__1) for Tabmask__C2, or to offset tables ST4.2 (offset d2__1), ST4.3 (offset d3__1) and St4.4 (offsets d4__1, d4__2 and d4__3) for Tabmask__C4. In fact, each table contains the possible offset or offsets permitting the manipulation of an object from a variable of a class, from this class to the class or classes from which it inherits. Finally, a third field, called "vtbl", corresponds to a pointer to a virtual table (for Tabmask__C2, the virtual tables VT2.1, VT2.2 and, for Tabmask C__4, the virtual tables VT4.1, VT4.2, VT4.3 and VT4.4) whose structure is the same as that for the technique employed with C++, and described with FIG. 1b.

The offset corresponding to the "fdeb" field can be useful during the explicit loading or unloading of an object from or to a secondary memory. In fact, during loading, it is the starting address of the object which is generally returned. By the same token, for unloading, it is often necessary to have the pointer at the starting address of the object.

Assumed, in order to generalize and study the implementation of inheritance via the structures described with FIG. 2b, is the manipulation of an object from a variable V, defined by "Ci" *V", designating an object of the real type, Cj. Thus, for loading an object, while assuming the existence of an explicit loading instruction expressed by "V=load__object (address__disk)", where "load__object" consists of loading an object from the hard disk into main memory, starting from its disk address and thus returning its virtual address, it is necessary to transform this operation into the following C language expression:

(V=load__object(address__disk), V=V+Tabclass[V→cid][i].fdeb);

In the same way, for unloading an object, assuming the existence of an explicit unloading instruction of the form "unload+object(V, address__disk, size);" which unloads the object on the disk at the address "address__disk" pointed to by the variable V in main memory, or "size" signifies the size of the object, it will be necessary to transform the instruction in the following manner:

unload__object((V-Tabclass[V→cid][i].fdeb),address__disk,size)

It will be noted that the size of the object can be easily saved, if necessary, in a supplementary table named, for example, "Size-class", access to the size then being had via "Sizeclass[(V→cid]".

At present, regarding access to the Ei state of an object, two cases from the figure can be shown. A first case, when it is the Ei state being accessed and knowing that the variable always points to the part Pi, access is then simply accomplished via "V→st". The cost in this case is thus the same as for the C++ technique described above. The second case presents itself when it is the Ej case being accessed, class Cj being a direct or indirect base class of Ci, access is then accomplished by means of "(V+Tabclass[V→cid][i].tabdep[(index(j)])→st".

In this instruction, "index(j)" is an index in the table of Ci base classes, which is determined statically by the code generator, this index being the same for all the masks associated with a given class. The entrance of the offset table (ST2.2, ST4.2, ST4.3 or ST4.4) supplies the offset permitting the calculation of the address of part Pj, starting from the address of part Pi. It is evident that, relative to the first case, the cost is about three indirections and three arithmetic operations: two additions and a multiplication. The cost here is therefore greater than that for the C++ technique, two indirections and three operations.

On the other hand, this is cost is constant, whatever the inheritance hierarchy, when it is necessary to add one indirection more for each level traversed with the C++ technique. With regard to calling the mi method, the latter is done in the same manner, the cost being constant with the C++ technique. The mi method is therefore called by:

"(*(Tabclass[V→cid][i]vtbl[index(mi)].m))(V→cid][i].vtbl[index(mi)].d . . . "

Remarkably, the first expression (between parentheses) permits the calculation of the function to be called which corresponds to the method mi, "index(mi)" being defined statically by the code generator which associates, with each class, the virtual table containing the methods applicable to it. The second expression permits the address of the part Pi to be passed as the first parameter of the function by utilizing the offset defined in the virtual table at the index "index(mi)", an output from said virtual table effectively containing, on the one hand, a pointer to the function storing the corresponding method and, on the other, said offset. This virtual table has the same structure for all the masks utilized in the derivative classes. However, the function associated with an entry, as well as the offset, can be different from one mask to another, since the methods can be redefined in the derivative classes. For example, the function m6_4 storing method m6 can be associated either with the offset d3_4 (virtual table VT4.3) or offset d4_4 (virtual table VT4.4).

Pursuant to the present, a translation example which will permit the proposed solution to be understood still better. This example is defined in the C++ language, which implements three classes introducing multiple inheritance links.

```
class Person {
public:
    char Name[40];
    char FirstName[30];
    long BirthDate;
    virtual short Age( );
};
class Taxable {
protected:
    double TaxableIncome;
public:
    virtual void AffectTaxableIncome( );
    virtual double calculTax( );
};
    class Salary: public virtual Person, public virtual Taxable {
    public:
    double GrossMonthlySalary;
    virtual void AffectTaxableIncome( );
    virtual double calculTax( );
};
```

-continued

The translation of this example into C language, implementing the mechanisms proposed above, is the following:
.General data linked to the example:

```
typedef int (*T_meth)(char *obj);
typedef struct {
    T_meth m;
    long d;
} s_vtbl;
typedet struct {
    long cid;
    long st;
} s_Part;
typedef struct {
    long fdeb;
    long *tabdep;
    s_vtbl *vtbl;
} s_tabmask;
s_tabmask *TabClass[ ]=
    {
    Tabmask_Person,
    Tabmask_Taxable,
    Tabmask_Salary
    };
long SizeClass[ ]=
    {
    sizeof(Person),
    sizeof(Taxable),
    sizeof(Salary)
    };
```
.Data relative to the class Person
define CID_PERSON(long)0)
```
typedef struct {
    long cid;
    struct {
        char Name[40];
        char FirstName[30];
        long BirthDate;
    } st;
} s_PPerson
typedef struct {
    s_PPerson PPerson;
} Person;
s_tabmask Tabmask_Person[ ]=
    {
    {0, NULL, vtbl_Person_Person}
    };
#define INDEX_PERSON_AGE 0
s_vtbl vtbl_Person_Person[ ]=
    {
    {(T_meth)Person_Age, 0}
    };
```
.Data relative to the Taxable class
define CID_TAXABLE ((long)1)
```
typedef struct {
    long cid;
    struct {
        double TaxableIncome;
    } st;
} s_PTaxable;
typedef struct {
    s_PTaxable PTaxable;
} Taxable;
s_tabmask Tabmask_Taxable[ ]=
    {
    {0, NULL, NULL};
    {0, NULL., vtbl_Taxable_Taxable}
    };
#define INDEX_TAXABLE_AFFECTINCOMETAX 0
#define INDEX_TAXABLE_CALCULTAX 1
s_vtbl vtbl_Taxable_Taxable[ ]=
    {
    {(T_meth)Taxable_AffectIncomeTax, 0}
    {(T_meth)Taxable_CalculTax, 0}
    };
```
.Data relative to the Salary class
define CID_SALARY ((long)2)
```
typedef struct {
    long cid;
    struct {
        double GrossMonthlySalary;
```

-continued
```
    } st;
} s_PSalary;
typedef struct {
    s_Psalary Psalary;
    s_PPerson PPerson;
    s_PTaxable PTaxable;
} Salary;
s_tabmask Tabmask_Salary[ ]=
    {
        {sizeof(s_PSalary), NULL, vtbl Salary Person),
        {sizeof(s_PSalary) + sizeof(s_PPerson), NULL,
vtbl_Salary_Taxable,
        {0, tabdep_Salary_Salary, vtbl_Salary_Salary}
    };
#define INDEX_SALARY_AGE ((long) 0)
#define INDEX_SALARY_AFFECTINCOMETAX ((long) 1)
#define INDEX_SALARY_CALCULTAX ((long) 2)
s_vtbl vtbl_Salary_Person[ ]=
    {
        {(T_meth)Person_Age, 0)
    };
    s_vtbl vtbl_Salary_Taxable[ ]=
    {
        {(T_meth)Salary_AffectIncomeTax,  -sizeof (s_PPerson)
sizeof (s_PSalary)},
        {T_meth)Salary_CalculTax,         -sizeof(s_PPerson)
sizeof (s_PSalary)}
    };
    s_vtbl vtbl_Salary_Salary[ ]=
    {
        {(T_meth)Person_Age,   sizeof(s_PSalary)}
        {(T_meth)Salary_AffectIncomeTax,   0},
        {(T_meth)Salary_CalculTax,    0}
    };
```

It should be noted that each function is prefixed with the name of the class defining it. In fact, as the methods are translated into the form of C functions and a method can be overloaded in a derivative class, it is necessary to prefix the names of the functions to distinguish two different ones implemented by a single method.

Employing the above translation as a point of departure, it is possible to show an example of the utilization of the structures thus defined. It is assumed that the following code fragment is to be translated:

```
    Person    *p;
    Salary    *s;
    short     a;
    ...
    p = s
    a = s→Age( ) + p→Age( );
    strcpy (s→Name, "toto");
    s→GrossMonthlySalary = 10000;
```

The translation is then the following:

```
    char    *p;
    char    *s;
    short   a;
    ...
    p = (s + Tabclass[((s_Part *)s)→cid] [CID_SALARY] .
    tabdep   {CID_PERSON]);
    a = ({Tabclass[((s_Part *).s)→cid] [CID_SALARY] . vtbl
    [INDEX_SALARY_AGE).m(s + Tabclass[s_Part *)s)→cid]
    [CID_SALARY] . vtbl [INDEX_SALARY_AGE).d)) +
    Tabclass[((s_Part *)s)→cid] [CID_PERSON] . vtbl
    [INDEX_PERSON_AGE).m(s + Tabclass[s_Part *)s)→cid]
    CID_PERSON] . vtbl [INDEX_PERSON_AGE].d)));
```

```
    strcpy (((s_PPerson *) (s + Tabclass[((s_Part
    *)s)→cid] [CID_SALARY] . tabdep [CID_PERSON]))→
    st.Name, "toto");
        ((s_PSalary *)s) → st.GrossMonthlySalary = 10000;
```

The solution proposed according to the present invention thus resolves all the problems connected with multiple inheritance in the context of persistent and shared objects, such as, for example, a linkage of objects in a shared UNIX memory segment. It is advantageously applicable to the C++ language when the latter is rendered persistent, but it can likewise be applied to any other language or system of persistent objects supporting the same concepts of inheritance. This solution is easy and effective to implement, the greater part of the treatment being effected statically at the time of compilation. The imposed addressing path can be applied anew, without prior operation, to the object in the process of being loaded. In conformity with the concept of the invention, the structure of the object is, on the one hand, independent of the code of the class and therefore of the address location at which it is going to be stored and, on the other, independent of the code of the class which produced this object.

I claim:

1. A process for managing multiple inheritance in objects of predetermined format in a database management system having a persistent space and a virtual space, and being capable of handling persistent and shared objects and handling languages employing persistent and shared objects, the process comprising the steps of:

(a) loading a plurality of objects from the persistent space into the virtual space without modifying the object format, wherein each object of said plurality of objects is produced by at least one class of a plurality of classes;

(b) assigning a class identifier to each object of the plurality of objects, wherein the particular class identifier assigned to each respective object is indicative of the at least one class which produced such object and wherein each such class identifier remains constant in all recompilation operations and in all applications utilizing the class and wherein the structure of each of the plurality of objects is independent of the address of storage in memory and of the code of the class producing this object, wherein said class identifier provides a consistent direct index into a table of classes containing entry points to a table of masks of said at least one class which produced said object, wherein said masks are indicative of the execution location of at least one of said objects; and (c) generating an addressing path from said entry point for managing inheritance relationships among a plurality of different classes wherein the step of generating an address path includes the step of accessing said table of masks through said entry point to provide a deterministic expression indicative of said addressing path.

2. The process of claim 1 wherein for the storage of the objects in memory the class identifier is identical for all the objects belonging to each respective class and wherein each class identifier includes:

a first subpart containing an identifier of the real class which created the object, said identifier being utilized as an index in the table of classes yielding the entry point of the path permitting the management of inheritance; and a second subpart which indicates a state defined by the class having produced the object, wherein the totality of the attributes defined by the class having produced the object are regrouped in the state.

3. The process of claim 2 wherein the class identifier assigned to each class is an integer.

4. The process of claim 2 wherein the table of classes supplies, for each class, a pointer to a table of masks, the table of masks containing a plurality of masks through which an object can be manipulated, each of the plurality of masks being defined by an inherited class and authorizing at the same time access to the methods permitting manipulation of the object as well as the part associated with the inherited class.

5. The process of claim 4 wherein the table of masks is provided having a number of masks one greater than the number of inherited classes wherein each mask contains three fields:

a first field corresponding to the offset permitting, starting from a pointer to the beginning address of the object, the calculation of a pointer to the part associated with the class having produced the object and vice versa;

a second field corresponding to a pointer to an offset table which yields the offset permitting the calculation of the address of the part associated with the object in question in order to access the state of said object; and a third field corresponding to a pointer to a virtual table permitting determination of the method to be called.

6. The process of claim 5, wherein when a method is called, a function to be called is calculated which corresponds to the method in question, an index being for that purpose defined statically by the generator of the code which associates with each class the virtual table containing the methods applicable to it, while an entry to said table contains a pointer to the function storing the corresponding method and an offset permitting calculation of the address of the part of the object to be passed as the first parameter of said method.

7. Apparatus for managing multiple inheritance in objects in a database management system having a persistent space and a virtual space, and being capable of working in a context of persistent and shared objects and handling languages employing persistent and shared objects, the apparatus comprising:

(a) means for loading a plurality of objects from the hard disk memory into the main memory, wherein the objects are arranged in a format which is not modified during loading, and wherein each object of the plurality of objects is produced by one of a plurality of classes;

(b) means for generating a respective identifier for association with each respective object, wherein the class identifier associated with each respective object is indicative of the respective class which produced the object, and wherein such identifier is employable without modification in recompilation operations and in applications utilizing the class, and wherein the structure of each object of the plurality of objects is independent of the address of storage in memory and of the code of the class producing such object, wherein said class identifier provides a consistent direct index into a table of classes containing an entry point to a table of masks of said respective class which produced each said respective object, wherein said masks are indicative of the execution location of at least one of said respective objects; and (c) means for generating an addressing path from said entry point for managing inheritance relationships among a plurality of different classes wherein the means for generating the addressing path includes accessing said table of masks through said entry point to provide a deterministic expression indicative of said addressing path.

8. The data base system of claim 7 wherein for the storage of the objects in the core memory, each respective identifier is identical for all the objects belonging to each respective class and wherein each identifier includes:

a first subpart containing an identifier of the real class which created the object, said identifier being utilized as an index in the table of classes yielding the entry point of the path permitting the management of inheritance; and a second subpart which indicates a state defined by the class having produced the object, wherein the totality of attributes defined by the class having produced the object are regrouped in the state.

9. The data base system of claim 8 herein each of said plurality of class identifiers is an integer.

10. The data base system of claim 8 wherein said table of classes provides, for each class, a pointer and said data base system further comprises:

a table of masks, the table of masks containing a plurality of masks through which an object can be manipulated, each of the plurality of masks being defined by an inherited class and authorizing at the same time access to the methods permitting manipulation of the object as well as the part associated with the inherited class.

11. The data base system of claim 10 wherein said table of masks is provided having a number of masks one greater than the number of inherited classes and wherein each mask includes:

a first field corresponding to the offset permitting, starting from a pointer to the beginning address of the object, the calculation of a pointer to the part associated with the class having produced the object and vice versa;

a second field corresponding to a pointer to an offset table which yields the offset permitting the calculation of the address of the part associated with the object in question in order to access the state of said object; and a third field corresponding to a pointer to a virtual table permitting determination of the method to be called.

12. The data base system of claim 11, wherein when a method is called, a function to be called is calculated which corresponds to the method in question, an index being for that purpose defined statically by a generator of code which associates with each class the virtual table containing the methods applicable to it, while an entry in the virtual table contains a pointer to the function storing the corresponding method and an offset permitting calculation of the address of the part of the object to be passed as the first parameter of said method.

* * * * *

UNITED STATES PATENT AND TRADEMARK OFFICE
CERTIFICATE OF CORRECTION

PATENT NO. : 6,052,528
DATED : April 18, 2000
INVENTOR(S) : Pascal Dechamboux

It is certified that error appears in the above-identified patent and that said Letters Patent is hereby corrected as shown below:

Column 10,
Lines 1-6, should read -- The translation of this example into C language, implementing the mechanisms proposed above, is the following:

.General data linked to the example: --;
Line 10, "typedet" should read -- typedef --;
Line 56, "NULL.," should read -- NULL, --;

Column 11,
Line 62, "a= ({Tabclass" should read -- a= ((Tabclass --;
Line 62, ".s)" should read -- s) --;

Column 14,
Line 25, "herein" should read -- wherein --.

Signed and Sealed this

Thirtieth Day of October, 2001

Attest:

NICHOLAS P. GODICI
*Attesting Officer*  *Acting Director of the United States Patent and Trademark Office*